April 4, 1950 T. F. PERRON ET AL 2,503,063
FILER'S GUIDE
Filed Dec. 12, 1947 2 Sheets-Sheet 1
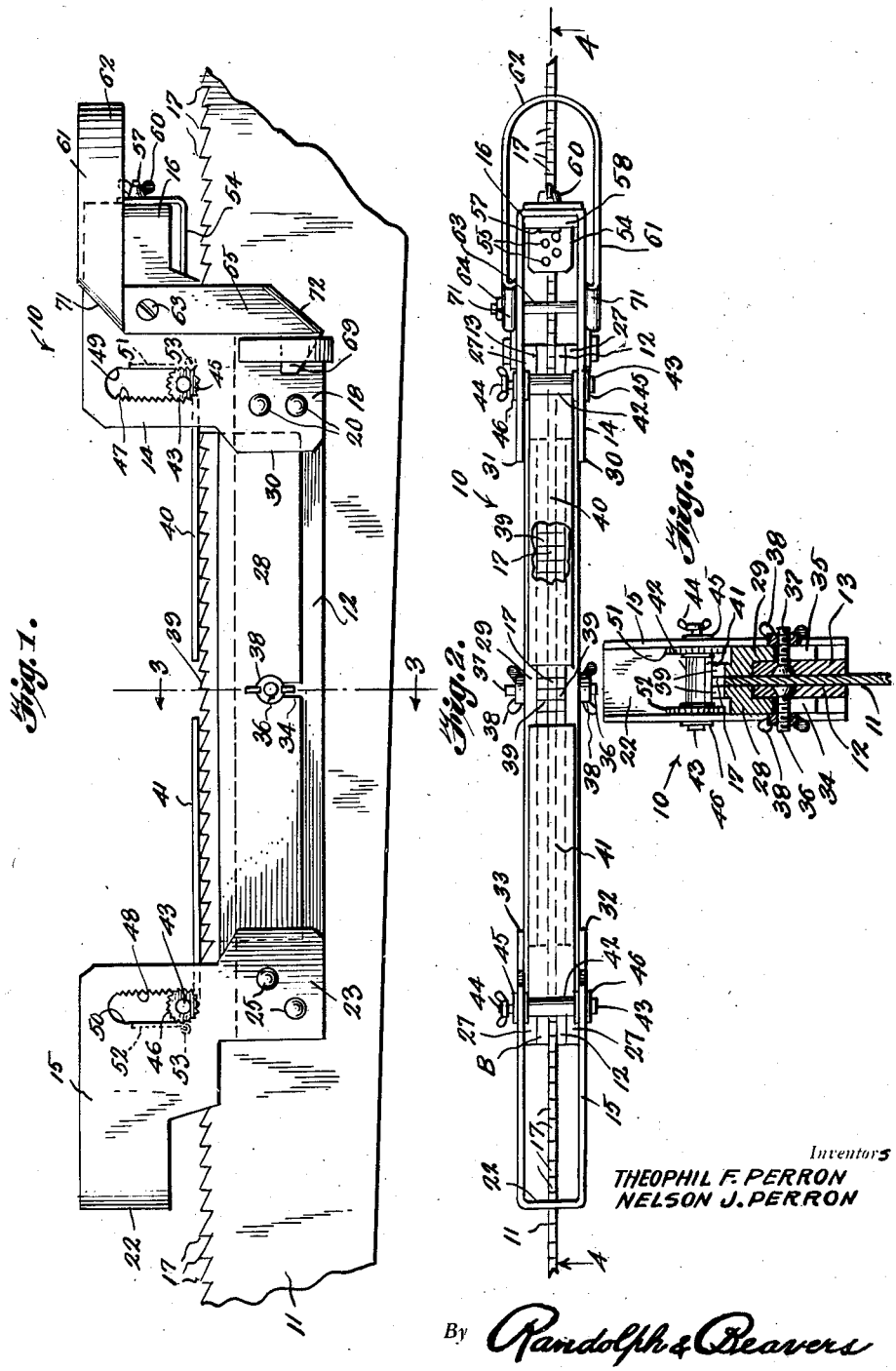
Inventors
THEOPHIL F. PERRON
NELSON J. PERRON
By Randolph & Beavers
Attorneys April 4, 1950     T. F. PERRON ET AL     2,503,063
FILER'S GUIDE
Filed Dec. 12, 1947     2 Sheets-Sheet 2
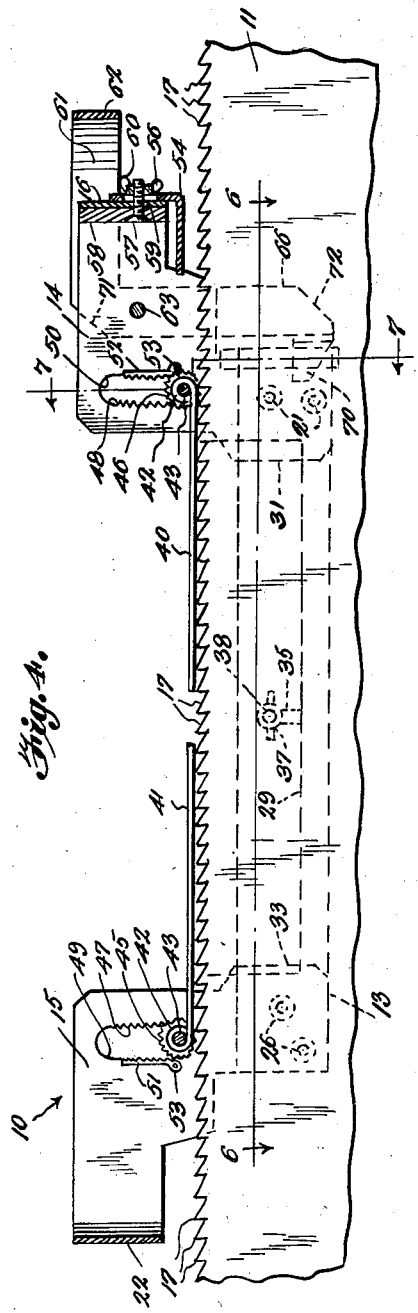
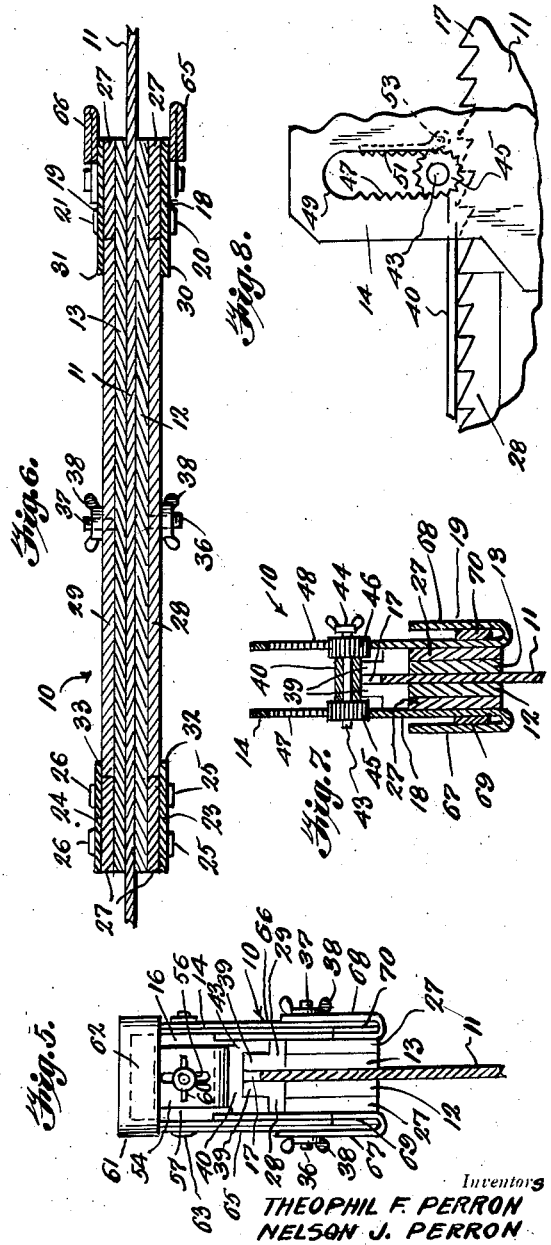
Inventors
THEOPHIL F. PERRON
NELSON J. PERRON
By *Randolph & Beavers*
Attorneys

Patented Apr. 4, 1950

2,503,063

UNITED STATES PATENT OFFICE 2,503,063

FILER'S GUIDE

Theophil F. Perron and Nelson J. Perron, Sault Sainte Marie, Mich.

Application December 12, 1947, Serial No. 791,198

3 Claims. (Cl. 76—36)

This invention relates generally to devices for facilitating the filing of saws and more particularly to a guide attachable thereto which includes a hardened guide member having teeth shaped in accordance with the initial or desired shape of the teeth of the saw to be filed and means for detachably securing the guide member in adjusted position on the saw whereby the saw readily and accurately may be sharpened or otherwise reconditioned in a manner simulating the original factory or desired condition thereof merely by filing in the teeth of the guide member until the teeth of the saw have been filed into conformity therewith, thus obviating the high degree of skill heretofore required of filers in placing saws in such condition.

An important object of the present invention is to provide a filer's guide of the aforedescribed character which is arranged to receive interchangeably therewith a plurality of guide members corresponding respectively to a wide variety of saws of different kinds and types whereby the guide may be used with equal facility and effectiveness in filing the teeth of any of such saws.

Other objects, features, and advantages of the present invention not expressly or implicitly set forth in the foregoing are those inherent in or implied from the novel construction, combination, and arrangement of parts comprising the filer's guide which has been constructed according to the best mode thus far contemplated for applying the principle of the invention and which is described in detail in the following specification wherein reference is made to the accompanying drawings in which:

Figure 1 is a view in elevation of the filer's guide shown attached in filing position on a saw whose teeth are to be filed, Figure 2 is a plan view of the guide as viewed from the top in Figure 1, a portion of the right-hand flusher being broken away to illustrate the toothed guide members and saw, Figures 3 and 4 are sectional views taken along the lines 3—3 of Figure 1 and 4—4 of Figure 2 respectively, Figure 5 is an end elevational view of the filer's guide as seen from the left in Figure 1, Figures 6 and 7 are sectional views taken respectively along the lines 6—6 and 7—7 of Figure 4, and Figure 8 is an enlarged fragmentary view of the left flusher as viewed in Figure 1 illustrating the adjustable mounting arrangement therefor.

For a detailed description of the filer's guide and the specific parts thereof, reference is now made in detail to the drawings wherein like characters of reference are employed to designate the same or similar parts throughout the several views.

The filer's guide is generally designated by the numeral 10 and is shown mounted on a saw 11 whose teeth 17 are to be filed. The guide comprises a pair of identical rectangularly shaped jaws 12 and 13 which are disposed in face adjacency with the saw on opposite sides thereof. The jaws are maintained in this spaced relation by a pair of generally V-shaped frames 14 and 15. Frame 14 has a bight portion 16 disposed above the teeth 17 of the saw and has depending leg portions 18 and 19 which are secured to jaws 12 and 13 by rivets as at 20 and 21 respectively. Similarly, frame 15 has a bight portion 22 disposed above the teeth 17 of the saw and has depending leg portions 23 and 24 secured to jaws 12 and 13 by rivets as at 25 and 26 respectively. It will be understood that, when desired, screws or the like may be employed in place of rivets to render the frames and jaws capable of disassembly and replacement of parts.

Spacers 27, which may be integrally formed with the jaws or with the frames, are interposed therebetween and riveted thereto for the purpose of causing the depending leg portions 18 and 19 and 23 and 24 of frames 14 and 15 respectively to overlap, as at 30 and 31 and 32 and 33 respectively, the ends of guide members 28 and 29 which are freely inserted between these overlapping portions of the frames and jaws 12 and 13 individual thereto; the guide members also being of rectangular configuration and having their respective lower edge portions disposed in face adjacency with jaws 12 and 13 and their respective upper edge portions offset and disposed in face adjacency with the saw on opposite sides thereof, as may best be seen in Figure 3.

Guide members 28 and 29 are slotted as at 34 and 35 respectively to receive screws 36 and 37 respectively carried by jaws 12 and 13. These screws are provided respectively with wing or butterfly nuts 38 whereby, upon vertical adjustment of the guide members in the channels formed by the frame members, spacers 27, and the jaws, the wing nuts may be tightened to retain the guide members securely in the adjusted position.

The guide members 28 and 29 are identical and are formed with teeth 39 having the shape desired for teeth 17 of the saw after the filing thereon is completed. To this end, the teeth of the guide members form the guiding surfaces for the file and must be sufficiently hard so as not to be cut thereby. For this purpose, the guide members may be formed of any suitable hard material such, for example, as certain types of glass or plastics or of metals such as tungsten or steel of certain types, or the teeth of the guide members may be hardened as by tempering or by case hardening, or otherwise hardened by methods well known in the art.

A pair of flushers 40 and 41 are employed for the purpose of determining when the tops of the teeth of the saw are flush with the tops of the teeth of the guide members, the flushers, to this end, being pivotally carried by frames 14 and 15 respectively with their pivotal axes adjustable vertically in accordance with an arrangement presently to be described. This mounting arrangement is the same for both flushers. Accordingly, it will suffice herein to limit the description thereof to only one of the flushers, to flusher 40 for example.

Each of the flushers 40 and 41 is doubled back as at 42 to form a hinged connection with a shaft 43 which has integrally formed therewith on one end thereof a wing or butterfly nut 44 whereby the shaft may be rotated by turning the nut. The shaft has secured thereto for rotation therewith a pair of pinions 45 and 46 which are respectively disposed on opposite sides of the flusher individual thereto. These pinions are disposed respectively in meshed engagement with the teeth of racks 47 and 48 formed respectively in the elongated vertical apertures 49 and 50 of the leg portions of the frame member individual thereto. Resilient or spring-like rack members 51 and 52 having teeth also engageable in meshed relation respectively with pinions 45 and 46 are each secured to the frame leg portion adjacent thereto as by a pin or rivet 53.

By reason of the foregoing arrangement, upon turning wing nut 44 clockwise in Figure 7, for example, shaft 43, and therefore the hinged end of flusher 40 carried thereby, is moved upwardly as pinions 45 and 46 move upwardly in racks 47 and 48 individual thereto. When this occurs, racks 51 and 52 yieldably slip out of meshed engagement with the pinions individual thereto. When rotation of shaft 43 ceases, however, racks 51 and 52 slip into meshed engagement with their respective pinions, thereby to releasably retain the shaft and flusher carried thereby in the adjusted position.

A gage 54 adjustably carried by the bight portion 16 of frame 14 is employed for the purpose of visually determining whether the teeth of the saw have been properly aligned as to profile with the teeth of the guides preparatory to beginning the filing operations. To this end, gage 54 is provided with a horizontal portion disposed above the teeth of the saw and having a plurality of apertures 55 formed therein and arranged in equal numbers alternately on opposite sides of the saw blade whereby at least one tooth of the blade may be viewed through the aperture upon sufficient longitudinal movement of guide 10 along the saw, thereby to bring the teeth of the saw into alignment with the teeth of the guide members.

Gage 54 has an upwardly extending portion disposed adjacent bight portion 16 of frame 14 and has a slot 56 formed therein through which extends a screw 57 which is secured to an anchor plate 58 disposed on the opposite side of the bight portion 16, the screw also extending through an aperture 59 therefor formed in the bight portion.

Screw 57 carries a wing nut 60 whereby gage 54 readily may be adjusted and secured conveniently above the teeth of the saw blade.

Frames 14 and 15 preferably are formed of sheet metal or other suitable material providing sufficient resiliency whereby the jaws 12 and 13 may yieldably be spread apart to insert the saw blade therebetween while thereafter firmly gripping the saw blade therebetween.

A V-shaped clamping lever 61, however, is also provided on frame 14 to insure a tight gripping engagement of the jaws with the saw. Lever 61 is in the form of a pair of bell cranks which are joined at the rounded bight portion 62 of lever 61, both legs of the lever being pivotally secured to the corresponding legs of frame member 14 by a screw 63 which passes completely through the legs of both V-shaped members and carries a nut 64 adjustable thereon to vary the spacing between the legs of the V-shaped members and thus control the spacing between the depending latch portions 65 and 66 of lever 61. The latch portions, in turn, control the spacing between the depending leg portions 18 and 19 of the frame 14 and thus determines the spacing between jaws 12 and 13. To this end, leg portions 18 and 19 are formed respectively with doubled-back ears 67 and 68 which provide spaces for receiving the latch ears 69 and 70 respectively.

Lever 61 conveniently may be formed from a single strip of sheet metal, for example, by first doubling back the strip to form bight portion 62, then folding each leg at 45° as at 71 to form the depending latch portions 65 and 66, and thereafter folding the latch portions at 45° as at 72 to form the latch ears 67 and 68.

In some cases it may be desirable to employ a similar locking lever on frame 15, in which case the structure and arrangement thereof may be identical to lever 61.

In some cases it may be sufficient to employ but one guide member, in which case the manner of use of guide 10 will not be appreciably altered.

From the foregoing description of guide 10, the manner of use thereof should now be clearly apparent. It will suffice therefore merely to point out that whereas different users of the guide may have various preferences as to the manner of use thereof, we have found that a satisfactory procedure is to first place the appropriate guide members in the guide substantially in the positions shown in Figure 3, then place guide 10 on the saw to be sharpened, the teeth on the saw moving into engagement with the hinge portions of flushers 40 and 41, then adjust guide 10 longitudinally of the saw until one or more teeth of the saw are visible through apertures 55 in gage 54, then adjust the flushers and guide members 28 and 29 vertically alternately until the teeth of the saw are flush with the teeth of the guide members and with the flushers, then tighten wing nuts 38, and finally move lever 61 into latching engagement with ears 67 and 68. The teeth of the saw are then in readiness to be filed.

In filing the teeth, one of the flushers may be left in engagement therewith, thereby protecting the hands and clothing of the filer from injury and damage on the teeth of the saw and guide members. After the teeth have been filed once, it may be necessary, depending on the condition of use of the saw, to readjust the guide members and the flushers and repeat the filing of certain of the teeth of the saw to bring the teeth into complete conformity with the teeth of the guide members.

From the foregoing it will now readily be appreciated that we have provided a filer's guide which is well adapted to fulfill the aforestated objects of the invention and, whereas we have illustrated herein but one physical embodiment of our invention, it is our intentions in the claims appended hereto, to cover all such additional embodiments and modifications thereof commensurate with the scope and spirit of our invention.

What we desire to secure by Letters Patent of the United States is:

1. A filer's guide comprising a pair of spaced jaws, a pair of V-shaped frames secured to said jaws for yieldably maintaining them in spaced relation whereby a saw blade to be filed may be inserted therebetween and yieldably gripped thereby, a pair of toothed guide members each having teeth of shape corresponding to the shape desired for the teeth of the saw blade, said jaws and frames being constructed and arranged to receive said guide members on opposite sides respectively of the saw blade with the teeth thereof in substantial alignment with the teeth of the guide members, a shaft disposed transversely of at least one of said frames above the teeth of the saw blade, a pair of racks formed in the legs of said one of the frames adjacent said shaft, a flusher member hingedly secured to said shaft and movable into engagement with the tops of the teeth of the saw blade and guide members, a pair of pinions carried by said shaft for rotation therewith and disposed on opposite sides of said flusher member in meshed engagement respectively with the teeth of said racks, a pair of spring-like racks secured respectively to the legs of said one of the frames and having the teeth thereof yieldably urged into meshing engagement respectively with said pair of pinions, a gage adjustably secured to said one of the frames and having a flat portion positionable above the teeth in the saw blade, said flat portion of said gage having a plurality of apertures therein for viewing the teeth of the saw blade therethrough, and a V-shaped latch member carried pivotally on said one of the frames and having a pair of ears at the extremities of the legs thereof movable into latching engagement with the extremities of the legs of said one of the frames at the point of connection of the jaws therewith thereby to move the jaws forcibly into gripping relation with the sides of the saw blade.

2. A filer's guide according to claim 1 but further characterized in that the flusher shaft carries a wing-nut head, means including wing-nuts are employed for detachably securing the guide members in adjusted position to the jaws individual thereto, and the gage is secured to its supporting frame by means including a wing nut, thereby to facilitate manual adjustments of the guide.

3. A filer's guide according to claim 1 but further characterized in that the pivotal connection between the V-shaped latch member and its V-shaped frame support comprises a screw extending transversely through the legs thereof and a nut therefor whereby the spacing between the legs may be varied upon adjustment of the nut on the screw.

THEOPHIL F. PERRON.
NELSON J. PERRON.

REFERENCES CITED

The following references are of record in the file of this patent:

UNITED STATES PATENTS

| Number | Name | Date |
|---|---|---|
| 189,534 | Walsh | Apr. 10, 1877 |
| 844,850 | Coble | Feb. 19, 1907 |
| 1,330,042 | Knizek | Feb. 3, 1920 |
| 1,475,351 | Phillips | Nov. 27, 1923 |
| 2,019,330 | Altman | Oct. 29, 1935 |
| 2,078,399 | Marsh et al. | Apr. 27, 1937 |